Nov. 28, 1961  E. F. WELLER, JR  3,010,313

DATA TRANSLATION SYSTEM

Filed Oct. 1, 1956  3 Sheets-Sheet 1

INVENTOR.
Edward F. Weller Jr.
BY
E. W. Christen
ATTORNEY.

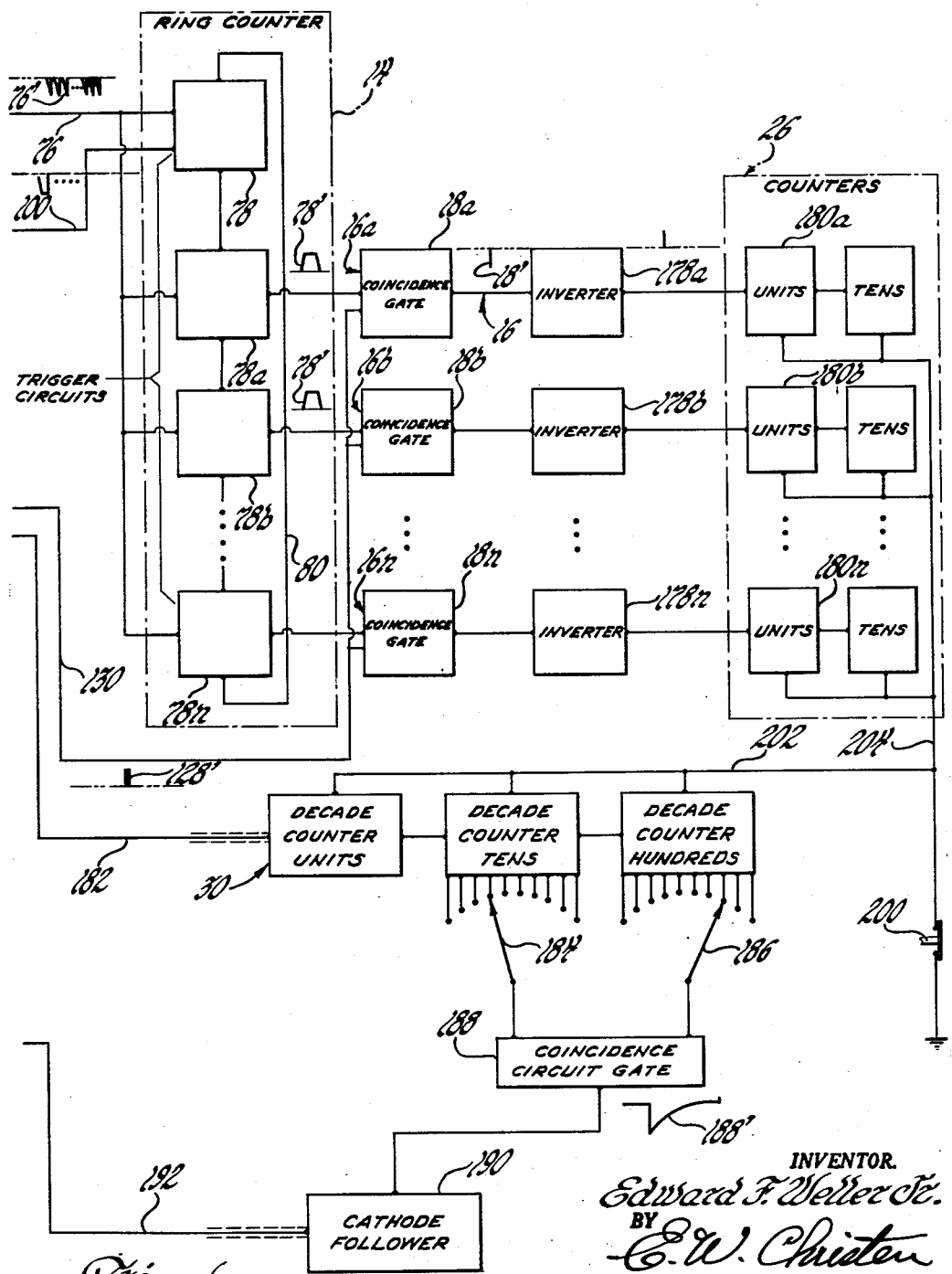

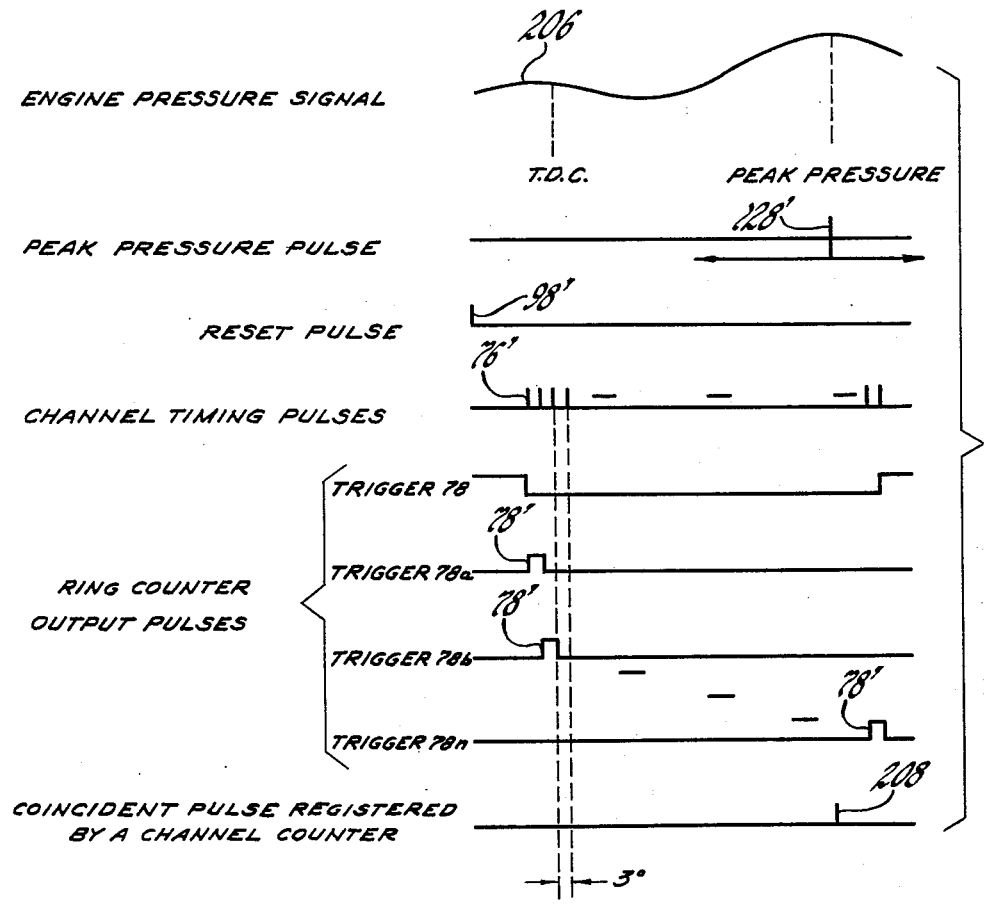

United States Patent Office 3,010,313
Patented Nov. 28, 1961

3,010,313
DATA TRANSLATION SYSTEM
Edward F. Weller, Jr., Detroit, Mich., assignor to General Motors Corporation, Detroit, Mich., a corporation of Delaware
Filed Oct. 1, 1956, Ser. No. 613,028
11 Claims. (Cl. 73—116)

This invention relates to data translation or data reduction and more particularly to an event counting system for determining the position or distribution of events with reference to the value of a variable quantity. It is especially adapted for use as a peak pressure distribution counting system for use in study of fuel characteristics for internal combustion engines.

In the study of fuels and combustion in internal combustion engines, a technique has been devised for rating a fuel in accordance with its characteristics of surface ignition resistance or particle induced ignition. Particle ignition causes erratic fuel burning and may be noticed as wild ping, pre-ignition, engnie roughness, or the like, and is characterized by a sharp rise in pressure in the combustion chamber. Normal combustion on the other hand is characterized by a gradual increase of pressure produced by a smooth burning flame front. The technique of rating involves the determination of the difference in position of peak pressure for normal and for particle induced ignition and comparison of this difference with the corresponding difference for a reference fuel. For the purpose of obtaining such data, particle ignition may be produced by injecting a known quantity of engine deposits into the combustion chamber of a test engine for both the reference and test fuels.

In engine operation, the peak pressure in the combustion chamber does not occur at the same specific crank angle in every cycle because of engine cyclic variations resulting from air-fuel ratio fluctuations and the like. Instead, the peak pressure occurs over a band of crank angles. When operated under conditions of particle induced ignition, the bandwidth of crank angles within which peak pressure occurs is greater than the corresponding bandwidth of normal ignition because of variation in deposit concentration. It is therefore necessary, in order to rate a fuel on this basis, to obtain sufficient data to determine the average value of crank angle at which the peak pressure event occurs for both normal ignition and particle induced ignition. This determination may be made from the measurement of the specific crank angle at which the peak pressure occurs in each cycle of a large number of engine operating cycles.

Accordingly, it is an object of this invention to provide a data translation system for determining as a function of a variable quantity the position of a variably occurring event.

Another object of this invention is to provide a data translation system for determining, as a function of an independent, periodically variable quantity, the positional distribution of a dependent, variably occurring event in a large number of cycles of the periodically varying quantity.

A further object of this invention is to provide a data translation system for determining event distribution in which the independently variable quantity is separated into plural bandwidth segments and the number of co-incidences of a dependently variable event with a given bandwidth segment is automatically counted.

An additional object of this invention is to provide a data translation system for determining event distribution and which is responsive to a predetermined total number of events for terminating the counting operation.

A more specific object of this engine is to provide a system for determining the distribution of peak pressure events as a function of crank angle for a large number of engine operation cycles.

A further object is to provide a peak pressure distribution counting system for internal combustion engines which automatically presents the number of occurrences of peak pressure corresponding to a given value of crank angle.

An additional object is to provide a peak pressure distribution counting system for internal combustion engines in which automatic control is provided for deposit injection and simultaneous initiation of distribution counting in timed relation with engine operation.

In accordance with this invention, the distribution of variably occurring events with respect to a variable quantity is determined by separating a selected bandwidth thereof, over which the events occur, into plural band-width segments. This is accomplished by providing plural signal channels, one corresponding to each bandwidth segment, which are sequentially switched by a reference signal generator to an active condition in timed relation with the variations of the variable quantity. Transducer means are employed to develop an event signal which is applied to all of the signal channels simultaneously so that the event signal is translated by the signal channel corresponding to the existing value of the variable quantity. Counting means are provided in each signal channel to register the number of occurrences of the event for each corresponding value of the variable quantity. Totalizer counting means may be utilized to terminate the counting operation after a predetermined number of occurrences of the event.

A more complete understanding of the invention may be had from the detailed description which follows taken with the accompanying drawings in which:

FIGURES 1 and 1a are a diagrammatic illustration of the inventive system.

FIGURE 2 is a graphical illustration for use in explaining the operation of the inventive system.

Figure 1:
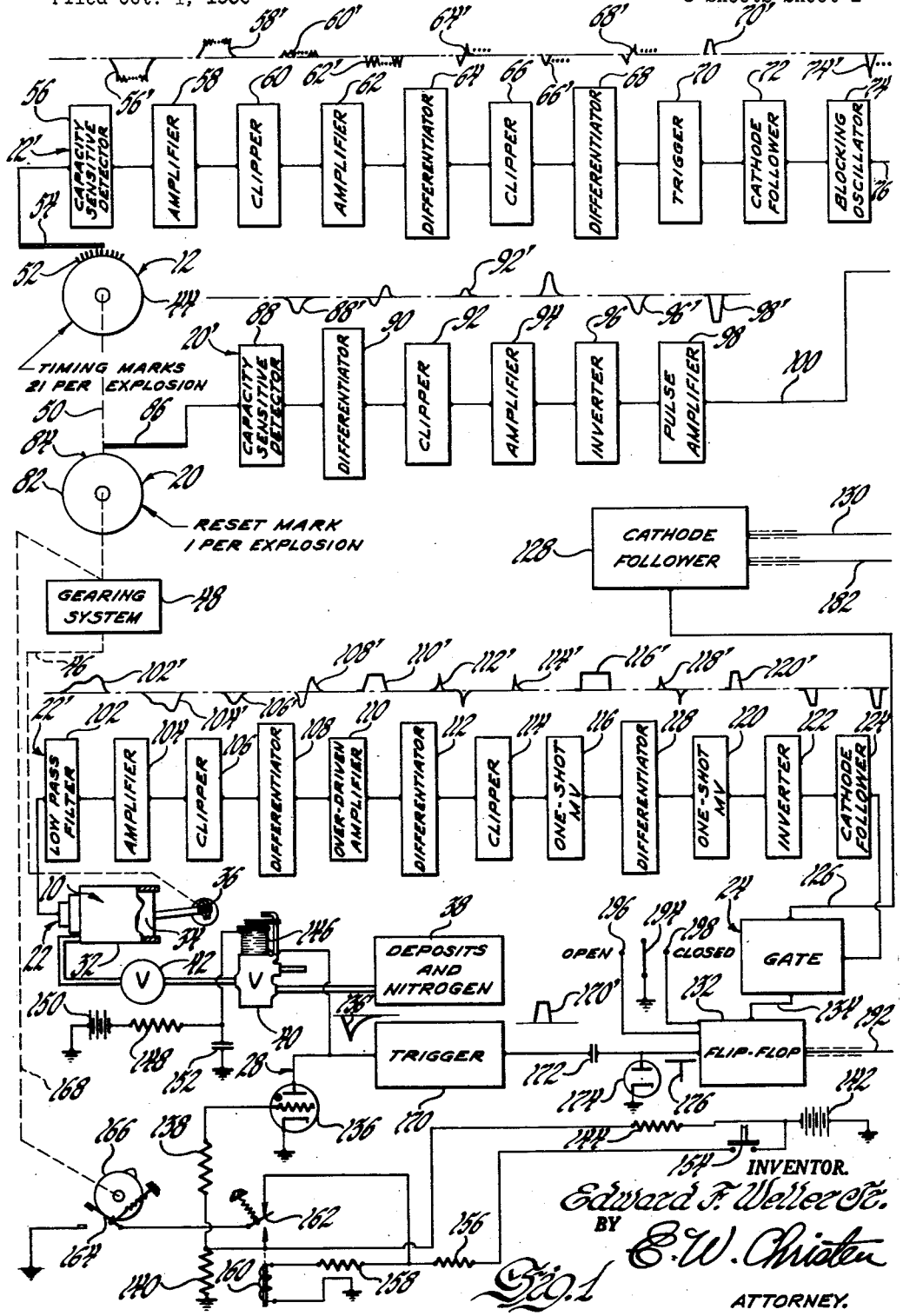

Referring now to the drawings, there is shown an illustrative embodiment of the invention in a system especially adapted for use in fuel studies for internal combustion engines. This system determines the distribution of peak pressure events in the combustion chamber as a function of crank angle displacement for a large number of engine operating cycles. In general, the system comprises a test engine 10 to which the fuel under test is supplied. The engine drives a timing or reference signal generator 12 for developing timing impulses which separate the range or bandwidth of crank angle values into plural bandwidth segments or channels. The reference signals are supplied through a reference signal channel 12' to the switching device or ring counter 14. A plurality of coincidence signal channels 16 corresponding in number to the crank angle bandwidth segments are provided which are sequentially activated by the ring counter 14 which gates the coincidence gate circuits 18. A reset signal generator 20 driven by the test engine develops a reset signal which is applied through the reset signal channel 20' at the end of each cycle to the ring counter 14 to insure proper orientation thereof for the succeeding cycle. The peak pressure event signal is developed by a pressure transducer 22 in the test engine and is applied through an event signal channel 22' to a control gate circuit 24 and thence to all of the coincidences gate circuits 18 simultaneously. In each cycle of operation, the peak pressure event signal will coincide with a gating voltage from the ring counter 14 in the signal channel which corresponds to the crank angle at which peak pressure occurs. Thus the coincidence gate circuit in that channel will be open and a count will be registered in the appropriate one of the channel counters 26. A control circuit, designated generally at 28, provides automatic control for the simultaneous introduction of deposits into the test engine and the opening of the control gate circuit 24 to initiate the counting operation. A pre-settable totalizer counter, designated generally at 30, is adapted to develop a stopping signal, upon the occurrence of a preset number of peak pressure signals, which is applied to the control gate circuit 24 to terminate the counting operation.

The test engine 10 may be a conventional type internal combustion engine including a cylinder 32 and a piston 34 defining a combustion chamber and having a crank shaft 36 driven by the piston. The test engine is provided with apparatus including a source 38 of engine deposits and gas pressure to permit injection of a controlled quantity of deposits into the combustion chamber. The source 38 is connected to the combustion chamber of the engine through a magnetic or relay actuated valve 40 and a manually actuated valve 42. The injection of such deposits is effected automatically at a predetermined value of crankshaft displacement or crank angle by the control circuit 28 which will be described subsequently.

In order to establish the range or bandwidth of crank angle values within which the distribution of peak pressures is to be considered and to separate this bandwidth into plural bandwidth segments or channels, the reference signal or timing generator 12 is provided. This generator comprises a rotor 44 driven by the engine crankshaft 36 through the shaft 46, gearing system 48, and shaft 50. In this arrangement the rotor 44 is driven through one revolution for each cycle of engine operation and is provided with a series of teeth 52 at its periphery. In the illustrative embodiment the bandwidth of crank angle values to be considered has been selected to have an angular extent of approximately 60 degrees commencing at a position corresponding to top dead-center of the piston 34. This bandwidth is separated at 3 degree intervals to provide 20 bandwidth segments or channels. In general, if the bandwidth is $m$ degrees in width it is separated into $n$ bandwidth segments each of which is $m/n$ degrees wide and the number of reference or timing signals per cycle is $n+1$. Accordingly, the teeth in the rotor of the reference signal generator are 21 in number and are equally spaced.

The reference signal generator 12 also includes a capacity type pick-up 54 disposed adjacent the periphery of the rotor 44 and adapted to coact with the teeth 52 to produce capacitance variations in accordance with the proximity thereof to an individual tooth. The pick-up 54 is connected to the input circuit of a capacity sensitive detector 56 which develops a signal voltage having a waveform 56' with a peak value corresponding to each of the generator teeth 52 and hence spaced at intervals corresponding to the selected bandwidth segment. This signal voltage is coupled through the amplifier 58 and inverted thereby as shown by waveform 58' and applied to the input circuit of the voltage clipper 60. The clipper 60 removes the pedestal portion of the input signal 58' to avoid overdriving and blocking subsequent amplifier stages and develops an output signal voltage waveform 60' which includes only the peaks or signal variations above the base line. The clipped signal 60' is amplified and inverted by the action of the amplifier 62 and the output signal voltage 62' is applied to the input circuit of the differentiator 64 which produces a voltage waveform 64' having a base line crossing point corresponding to each peak of the input voltage 62'. The differentiated signal voltage 64' is applied to the input circuit of the clipper 66 to remove the positive peaks and produce a series of negative voltage pulses 66'. The clipped voltage 66' is differentiated by the differentiator 68 to produce a voltage pulse 68' which is applied to the input of the trigger circuit 70. The circuit 70 develops a trigger pulse 70' which may be amplified in the cathode follower amplifier 72 to drive the blocking oscillator 74. The output voltage 74' from the blocking oscillator is a negative pulse corresponding to each of the voltage peaks of the signal voltage 56' and is coupled through the conductor 76 to the input circuit of the switching circuit 14.

The switching circuit 14 is adapted to respond to the reference signals to develop sequential gating voltages to render the coincidence signal channels 16a, 16b . . . and 16n active in succession. This switching circuit preferably takes the form of a ring counter and comprises a plurality of cascade coupled Eccles-Jordan type double stability trigger circuits 78, 78a, 78b . . . and 78n. The number of trigger circuits employed is equal to the number of reference signals per cycle which is one greater than the number of coincidence signal channels. In this type of circuit, the reference signals are applied to the input circuit of each trigger stage. One stage of the ring is maintained in one stable state of conduction while the remaining stages are maintained in the other stable state of conduction. Each succeeding reference signal is effective to index the ring one step forward by transferring the first stable state condition to the succeeding stage. The final trigger stage is coupled through conductor 80 to the initial or return trigger stage 78 so that the indexing action is continuous. Each trigger stage, while in the first stable condition, develops in its output circuit a positive gating voltage 78' having a duration corresponding to the interval between succeeding reference signals.

In order to assure proper orientation of the ring counter at the commencement of each cycle there is provided a reset signal generator 20. This generator includes a rotor 82 mounted on the shaft 50 and having a single tooth 84. A capacity type pick-up 86 coacts with the tooth once each revolution to develop a capacity variation coupled to the capacity sensitive detector 88 which responds thereto to develop a reset signal voltage 88'. This voltage is differentiated by the stage 90 and is clipped by the voltage clipper stage 92 to remove the negative portion to leave the positive voltage pulse 92' which is amplified in stage 94 and phase inverted by the inverter 96. The inverted signal voltage 96' is employed to drive the pulse amplifier 98 which develops an output reset signal pulse 98' which is applied through the conductor 100 to the return stage 78 of the ring counter. The generator rotor 82 is angularly adjusted with reference to the reference signal generator 12 so that the reset signal pulse occurs each revolution just prior to the first of the reference signal voltages.

Each trigger stage of the ring counter is connected to the corresponding one of the coincidence signal channels which are rendered active in succession by the sequential gating voltages 78'. This action is accomplished by providing in each coincidence signal channel 16a, 16b . . . and 16n a coincidence gate circuit 18a, 18b . . . and 18n, respectively, each having one input circuit connected with the output circuit of the corresponding trigger stage. The application of a positive gating voltage to a coincidence circuit is effective to open the gate and permit translation of signal voltages applied theerto in a manner to be described presently.

A peak pressure event signal voltage is developed once each cycle by the pressure transducer 22 and the associated waveshaping circuits in peak pressure channel 22' for application to the coincidence signal channels 16a, 16b . . . and 16n. The pressure transducer 22, mounted in the cylinder head to respond to combustion chamber pressure variations, is suitably a capacity type pick-up provided with an associated capacity sensitive detector which develops an output signal voltage having a waveshape corresponding to the pressure variations. This signal voltage is passed through a low pass filter 102 to remove the high frequency components, caused by spurious variations such as engine knock in the combustion chamber, to produce a voltage waveform 102'. The voltage 102' is amplified and inverted by the amplifier 104. This voltage, having waveform 104', is clipped by the clipper stage 106 preferably of the type having an adjustable clipping level. The clipping level is normally established to pass the portion of the signal 104' which corresponds to the pressures exceeding the compression pressure at top dead center of the piston in the combustion chamber. The resulting voltage, having a waveform 106', has a flat base line and has only one point of zero slope which corresponds to the occurrence of peak pressure in the combustion chamber. This signal voltage 106' is differentiated in the differentiator stage 108 and the resulting signal waveform 108' has a base line crossing point corresponding to the peak or zero slope point of the input signal 106' and hence corresponding to peak pressure. Since the input signal voltage 106' to the differentiator 108 may assume a variety of waveforms and amplitudes, it is desirable that the differentiator 108 be of the type that provides good broadband response over a wide amplitude range. The differentiated voltage 108' is applied to the overdriven amplifier 110 to develop a rectangular pulse 110' having a leading edge corresponding to the occurrence of peak pressure. This signal pulse 110' is differentiated by the stage 112 and negative spike of the differentiated signal 112' is removed by the clipper 114. The remaining positive spike 114' is applied to a one-shot multivibrator 116 which develops a rectangular pulse 116'. The duration of the pulse 116' is sufficiently long to preclude any re-triggering thereof due to oscillation in the amplifiers. For this purpose the pulse duration developed by the one shot multivibrator 116 should exceed the portion of the cycle during which the reference signals are developed by the reference signal generator 12.

In order to develop the desired waveform, the rectangular pulse 116' from the one-shot multivibrator is differentiated by the stage 118 and the leading spike of the differentiated voltage 118' is applied to the one-shot multivibrator 120 to develop an output rectangular voltage pulse 120' of short duration relative to the duration of the gating pulses 78'. This peak pressure pulse 120' is inverted by the inverter stage 122 and coupled, through the cathode follower stage 124 for impedance transformation, to the signal input circuit of the control gate circuit 24.

The control gate circuit 24 is a coincidence type circuit and is adapted, when in the open condition, to translate the peak pressure signal voltage through the output circuit conductor 126, cathode follower 128, and conductor 130 to the signal input circuit of each of the coincidence gate circuits 18a, 18b, . . . and 18n in the coincidence signal channels 16a, 16b, . . . and 16n. When the control gate circuit 24 is in the closed condition the peak pressure signal voltage applied from cathode follower 124 is interrupted. The control gate circuit 24 is switched to the open or closed condition by the flip-flop circuit 132 which develops a gating voltage in its output circuit which is connected by the conductor 134 to the other input circuit of the control gate circuit 24. The flip-flop circuit 132 is caused to develop a gating voltage to open the control gate circuit 24 under the influence of the control circuit 28 to be described presently.

The control circuit 28 provides for manually supervised, automatic control for initiating an operating cycle. This control circuit comprises a control tube 136 suitably a thyratron having an input circuit extending between the grid electrode and cathode electrode through resistors 138 and 140 to a point of reference potential or ground. The output circuit of the control tube 136 extends between the plate and cathode electrodes and has one branch including the relay actuated valve 40 and another branch for control of the flip-flop circuit 132. A source of voltage 142 has its positive terminal connected to ground and its negative terminal connected through the resistor 144 and resistor 140 to ground to develop a negative bias on the control electrode of the tube 136 to maintain it normally non-conductive. The output circuit branch including the relay actuated valve 40 extends from the palte electrode of the tube 136 through the relay coil 146, the resistor 148 and voltage source 150 to ground. Connected in parallel with the resistor 148 and voltage source 150 is a condenser 152 which forms with the resistor 148 a circuit having a relatively large time constant for purposes which will appear hereinafter. A manual control circuit extends from the battery 142 through the push-button starting switch 154, resistors 156 and 158, and the coil of relay 160 to ground. The armature of the relay 160 actuates a movable switch contact 162 which is spring biased into engagement with the upper fixed contact connected to the junction of resistors 156 and 158. The relay 160 when energized by the starting switch 154 displaces the movable switch contact 162 into engagement with the lower fixed contact which is connected to the junction of resistors 140 and 138. This is effective to complete a circuit from the grid electrode of tube 136 through the resistor 138 and the movable switch contact 162 to the cam actuated switch 164. The cam 166 is rotatably driven from the gearing system 48 through the shaft 168 in synchronism with the crankshaft of the test engine 10. The cam 166 has a single lobe which corresponds in angular position to the occurrence of a low pressure in the combustion chamber, such as occurs during the intake stroke of the engine. The single lobe on the cam 166 is effective to close the switch 164 and complete a circuit to ground for the control electrode of the tube 136. Thus the negative bias is removed and the tube is rendered conductive permitting the condenser 152 to discharge through the relay coil 146 and the tube 136 to energize the relay actuated valve 40. Accordingly, the deposits from the source 38 are injected under the influence of the gas pressure through the valves 40 and 42 to the combustion chamber of the engine 10. The output branch circuit of the tube 136 for controlling the flip-flop circuit 132 extends from the plate electrode to the input of the trigger stage 170. This trigger stage is responsive to the negative going impulses 136', occasioned by the conduction of tube 136, to develop a rectangular pulse 170' which is differentiated and clipped by the condenser 172 and shunt diode 174. The resulting voltage is a negative spike 176 corresponding to the leading edge of the pulse 170' and is applied to one input circuit of the flip-flop 132. This causes the flip-flop to develop a gating voltage which is applied to the control gate circuit 24 to open the gate and permit translation of the peak pressure signals to the coincidence signal channels.

In the coincidence signal channels 16a, 16b, . . . and 16n, the coincidence of a peak pressure signal voltage with a gating voltage from the ring counter 14 is detected and the total number of such coincidences for each channel is counted for multiple cycles for operation. For this purpose the peak pressure signal voltage is applied to the input circuits of all the coincidence gate circuits 18a, 18b, . . . and 18n, simultaneously. In the absence of a gating voltage applied to the input of a particular coincidence gate circuit, the gate is closed and the corresponding signal channel is inactive. In the presence of gating voltage at a particular coincidence gate circuit, the channel is rendered active and a coincident peak pressure voltage is translated thereby in the form of a negative voltage spike 18'. This negative voltage spike is inverted by the corresponding inverter stage 178a, 178b, . . . or 178n and applied thereby to the input circuit of the corresponding signal channel decade counter 180a, 180b, . . . or 180n. Each signal channel decade counter suitably includes units stage and tens stage to permit registration of coincidence signal voltages up to a total count of 99. The decade counters are preferably of the conventional glow transfer tube type adapted to present a visual display of the total number of counts.

In order to provide for termination of the counting operation upon the occurrence of a predetermined total number of cycles of engine operation or peak pressure signals, there is provided a totalizer counter 30. This totalizer is suitably of the decade type including units, tens, and hundreds stages and the peak pressure signal voltages are applied to the input circuit from the cathode follower stage 128 through the conductor 182. The totalizer is pre-settable to respond to a selected total count by providing the tens stage with a selector switch 184 and the hundreds stage with a selector switch 186. Thus the total count may be pre-set in increments of 10 up to 990 counts. To develop a stopping signal voltage upon the occurrence of the pre-selected total count there is provided a coincidence gate circuit 188 having one input circuit connected to the selector switch 184 and the other input circuit connected to the selector switch 186. In response to the coincidence of input voltages from the tens and hundreds stages, the coincidence gate circuit 188 develops an output voltage pulse 188' which is coupled through a cathode follower 190 and conductor 192 to a second input circuit of the flip-flop stage 132. The stopping signal voltage thus developed causes the flip-flop to terminate the gating voltage on conductor 134 which closes the gate circuit 24. Accordingly, the translation of the peak pressure signal voltages is terminated and the counting operation in the coincidence signal channels ceases.

A manual control for the control gate circuit 24 is provided to permit the operator to initiate the counting operation without injecting a charge of deposits into the combustion chamber and to terminate the counting operation after any desired number of cycles. This manual control comprises a manual switch 194 having a movable contact connected to ground which is normally in an open circuit condition, as shown, for automatic operation. The movable contact of switch 194 may be displaced into engagement with the fixed contact 196 which is connected in an input circuit of the flip-flop stage 132. With the switch 194 in this "open" position the flip-flop stage develops a gating voltage in its output circuit which is applied by conductor 134 to the control gate stage 24 to open the gate and permit translation of the peak pressure signal voltages. The switch 194 may also be displaced to the "closed" position into engagement with the fixed contact 198 which is also connected in an input circuit of the flip-flop stage 132 and in this condition is effective to terminate the gating voltage on conductor 134. Thus, the control gate 24 is closed and translation of peak pressure signal voltages is interrupted and the counting operation ceases.

A counter reset control circuit is provided to zero the counters prior to the commencement of an operating period. This circuit comprises a normally closed manual switch 200 having one terminal connected to ground. The other terminal is connected through conductor 202 to each stage of the totalizer 30 and through conductor 204 to each stage of all the channel counters 26. The interruption of the grounding circuit by switch 200 is effective to reset each stage to zero.

The explanation of the operation of the inventive system will be facilitated by reference to the graphical representation of FIGURE 2. In order to obtain a count of the peak pressure distribution for a given fuel and engine utilizing the system in its automatic operation, the counters are reset by switch 200 and the totalizer counter 30 is preset to the desired total number of cycles by positioning the switch contacts 184 and 186. The manual control switch 194 is displaced to the open-circuit position shown. With the engine 10 running, the operator closes the starting switch 154 to complete the energizing circuit for the relay 160. During the intake stroke of the engine 10, the cam actuated switch 164 will be open permitting energization of the relay 160 and causing closure of the switch 162 against the lower contact. Thus, during the intake stroke of the engine 10, the control electrode of the tube 136 will be grounded and the tube 136 will become conductive. This permits condenser 152 to discharge through the relay winding 146 of the valve 40 with sufficient current to actuate the valve to the open position permitting injection of the deposits into the combustion chamber. The valve 40 is actuated only once each time the switch 154 is closed because the condenser 152 is almost completely discharged during the conduction of the tube 136. The condenser 152 is slowly recharged from voltage source 150, due to the long time constant of resistor 148 and condenser 152, so that the voltage across the condenser 152 is insufficient to reactuate the valve 40 even though the starting switch 154 is not released instantly. The conduction through the tube 136 develops the trigger voltage 176 which is applied to the flip-flop stage 132 causing a gating voltage to be applied to the control gate 24 to open the gate.

In FIGURE 2, the occurrence of various events during an operating cycle is shown as a function of time. The combustion chamber pressure variation during a compression stroke of the piston 34 is represented by the curve 206. The position of top dead center for the piston 34 is indicated by the legend "T.D.C." and the position at which peak pressure occurs is identified by appropriate legend. The reset pulse 98' occurs first in the sequence of events and is developed by the reset signal generator 20 and the reset signal channel 20' and applied through conductor 100 to the return stage 78 of the ring counter 14 to assure proper orientation thereof.

The reference signal generator 12 and the reference signal channel develop the series of reference signal voltages 76' which are applied to the input circuits of the ring counter 14. Accordingly, the counter stages 78, 78a, 78b . . . and 78n sequentially develop gating voltages 78' which are applied to the signal channels 16a, 16b, . . . 16n successively to render the channels active for intervals corresponding to the intervals between successive reference voltages. The peak pressure event signal or pulse 128' is developed by the pressure transducer 22 and peak pressure channel 22' and applied to all of the coincidence gate circuits in the signal channels simultaneously. Accordingly, the peak pressure pulse will coincide with a gating pulse, in a particular signal channel depending on the position of its occurrence in the cycle, and will be translated to the corresponding channel counter. Thus for each cycle of operation, a coincident pulse 208 will be registered by the channel counter corresponding to the crank angle at which the peak pressure signal voltage occurred. When the total number of peak pressure events equals the preset count established in the totalizer 30 a stopping signal voltage 188' will be developed by the coincidence gate circuit 188 and will be applied to the flip-flop stage 132 to terminate the gating voltage thereof. Accordingly, the control gate stage 24 will be closed and the counting operation will be terminated. If desired, the counting operation may be terminated prior to the attainment of the preset count in the totalizer by operating the manual switch 194 to the closed position to terminate the gating voltage of flip-flop stage 132 and close the control gate circuit 24. As previously mentioned, the counting operation may be initiated without the incident injection of deposits into the combustion chamber by operating the manual switch 194 to the open position. This causes the flip-flop circuit 132 to develop a gating voltage which opens the control gate 24 and initiates the counting operation. Automatic termination of the counting operation may be had by use of the totalizer, as previously described, or manual termination may be had by operating the manual switch 194 to the closed position.

Although the description of this invention has been given with respect to a particular embodiment, it is not to be construed in a limiting sense. Many variations and modifications within the spirit and scope of the invention will now occur to those skilled in the art. For a definition of the invention reference is made to the appended claims.

I claim:

1. A data translation system for determining as a function of a time varing quantity, the position of a variably occurring event, said system comprising a reference signal generator responsive to the magnitude of said time varying quantity for generating reference signals upon the occurrence of predetermined values of said quantity, a signal channel corresponding to each predetermined value, switching means connected between said generator and said signal channels and being responsive to the reference signals for switching the channels sequentially, an event responsive generator for generating an event signal upon the occurrence of said event, means connecting the event responsive generator to the signal channels for applying the event signal to all channels simultaneously, and means in each channel responsive to the translation of an event signal thereby.

2. A data translation system for determining, as a function of a periodically variable quantity, the distribution of variably occurring events over repeated cycles of said quantity, said system comprising reference signal means for generating reference signals corresponding to predetermined values of said quantity, a ring counter gate signal generator defining a signal channel corresponding to each predetermined value and responsive to the reference signals for gating the channels sequentially, a coincidence gate circuit in each channel, event responsive means for generating an event signal upon the occurrence of said event in each cycle, means applying the event signal to all of the coincidence gate circuits simultaneously, a reset signal generator developing a reset signal at the end of each cycle and connected with the ring counter gate signal generator for resetting the same, and counting means connected with each channel for indicating the number of occurrences of the event which correspond to a given predetermined value of said quantity.

3. A data translation system for determining, as a function of a periodically variable quantity, the distribution of variably occurring events over repeated cycles of said quantity, said system comprising reference signal means for generating reference signals corresponding to predetermined values of said quantity, switching means defining a signal channel corresponding to each predetermined value and responsive to the reference signals for switching the channels sequentially, event responsive means for generating an event signal upon the occurrence of said event in each cycle, a gate circuit coupling the event responsive means to said switching means for applying the event signal to all of said channels simultaneously, counting means connected with each channel for indicating the number of occurrences of the event which correspond to a given predetermined value of said quantity, presettable totalizer counting means coupled with the event responsive means and adapted to develop an output signal upon the occurrence of a preset number of events, and means applying the output signal of said totalizer counting means to said gate circuit for terminating the application of the event signals to said channels when the preset number of events has occurred.

4. A data translation system for determining, as a function of a periodically variable quantity, the distribution of variably occurring events over repeated cycles of said quantity, said system comprising reference signal means for generating reference signals corresponding to predetermined values of said quantity, switching means defining a signal channel corresponding to each predetermined value and responsive to the reference signals for switching the channels sequentially, event responsive means for generating an event signal upon the occurrence of said event in each cycle, a gate circuit coupling the event responsive means to said switching means for applying the event signal to all of said channels simultaneously, a starting signal generator including a manual control device and being responsive to a predetermined value of said quantity and connected with the gate circuit for initiating the application of the event signals to said channels, and counting means connected with each channel for indicating the number of occurrences of the event which correspond to a given predetermined value of said quantity.

5. The combination defined by claim 4 including a presettable totalizer counting means coupled with the event responsive means and adapted to develop an output signal upon the occurrence of a preset number of events, and means applying the output signal of said totalizer counting means to said gate circuit for terminating the application of the event signals to said channels when the preset number of events has occurred.

6. A peak pressure distribution counting system comprising an internal combustion engine having a cylinder and a piston defining a combustion chamber and a crankshaft driven by the piston, means including a relay actuated valve for injecting deposits into the combustion chamber at a selected point in a cycle of engine operation, transducer means responsive to combustion chamber pressure for developing a peak pressure signal upon the occurrence of maximum pressure in each cycle of engine operation, plural signal channels each including a coincidence gate circuit and a counter for registering the number of peak pressure signals received, a signal generator driven by crankshaft for developing a timing signal corresponding to each signal channel for each cycle of engine operation, a ring counter circuit responsive to said timing signals and having a different gating channel connected to a corresponding one of said signal channels and developing sequential gating voltages in the plural channels, a control gate circuit interposed between the transducer means and the coincidence gate circuits for applying the peak pressure signal to all of the coincidence gate circuits simultaneously, and a control circuit connected with the control gate circuit and the relay actuated valve for simultaneous opening thereof, said control circuit including a manual switch for conditioning the control circuit for energization and a crankshaft actuated switch for energization of the control circuit.

7. A peak pressure distribution counting system comprising an internal combustion engine having a cylinder and a piston defining a combustion chamber and a crankshaft driven by the piston, means including a relay actuated valve for injecting deposits into the combustion chamber at a selected point in a cycle of engine operation, transducer means responsive to combustion chamber pressure for developing a peak pressure signal upon the occurrence of maximum pressure in each cycle of engine operation, plural signal channels each including a coincidence gate circuit and a counter for registering the number of peak pressure signals received, a signal generator driven by crankshaft for developing a timing signal corresponding to each signal channel for each cycle of engine operation, a ring counter circuit responsive to said timing signals and having a different gating channel connected to a corresponding one of said signal channels and developing sequential gating voltages in the plural channels, a control gate circuit interposed between the transducer means and the coincidence gate circuits for applying the peak pressure signal to all of the coincidence gate circuits simultaneously, a flip-flop gating signal circuit coupled to and adapted to close or open the control gate circuit, a control circuit connected with the flip-flop gating signal circuit and the relay actuated valve for simultaneous opening of the control gate circuit and valve, said control circuit including a manual switch for conditioning the control circuit for energization and a crankshaft actuated switch for energization of the control circuit, a presettable totalizer counting means coupled with the transducer means through the control gate circuit and adapted to develop a stopping signal upon the occurrence of a preset number of peak pressure signals, and means applying the stopping signal to the flip-flop gating signal circuit to close the control gate circuit and terminate application of the peak pressure signals to the coincidence gate circuits.

8. In combination, an internal combustion engine having a cylinder and a piston defining a combustion chamber and a crankshaft driven by the piston, means responsive to crankshaft displacement for injecting deposits into the combustion chamber, a pressure signal generator responsive to combustion chamber pressure for developing a peak pressure signal upon the occurrence of maximum pressure in each cycle of engine operation, a reference signal generator responsive to crankshaft rotation for developing plural displacement signals for each cycle of engine operation, coincidence means having a different channel corresponding to each of said plural displacement signals, a gate signal generator connected between the reference signal generator and the coincidence means for gating the coincidence means sequentially, means for indicating coincidence of the peak pressure signal with a displacement signal in each cycle of engine operation, means responsive to crankshaft displacement for initiating application of the peak pressure signals to the coincidence means, and totalizer counting means responsive to peak pressure signals for terminating application of the peak pressure signals to the coincidence means upon the occurrence of a preset number of cycles of engine operation.

9. A peak pressure distribution counting system comprising an internal combustion engine having a cylinder and a piston defining a combustion chamber and a crankshaft driven by the piston, means for injecting deposits into the combustion chamber at a selected point in a cycle of engine operation and including a relay actuated valve, transducer means responsive to combustion chamber pressure for developing a peak pressure signal upon the occurrence of maximum pressure in each cycle of engine operation, a reference signal generator responsive to crankshaft rotation for developing plural displacement signals for each cycle of engine operation, coincidence means having a different channel corresponding to each of said plural displacement signals including means for counting the number of coincidences of the peak pressure signal with the corresponding displacement signal, a ring counter connected between the reference signal generator and the coincidence means for gating the coincidence means sequentially, and a gate circuit interposed between the transducer means and the coincidence means, a control circuit connected with the gate circuit and the relay actuated valve for simultaneous actuation thereof, said control circuit including a manual switch for conditioning the control circuit for energization and a crankshaft actuated switch for energization of the control circuit.

10. A peak pressure distribution counting system comprising an internal combustion engine having a cylinder and a piston defining a combustion chamber and a crankshaft driven by the piston, means for injecting deposits into the combustion chamber at a selected point in a cycle of engine operation and including a relay actuated valve, transducer means responsive to combustion chamber pressure for developing a peak pressure signal upon the occurrence of maximum pressure in each cycle of engine operation, a reference signal generator responsive to crankshaft rotation for developing plural displacement signals for each cycle of engine operation, coincidence means having a different channel corresponding to each of said plural displacement signals including means for counting the number of coincidences of the peak pressure signal with the corresponding displacement signal, a ring counter connected between the reference signal generator and the coincidence means for gating the coincidence means sequentially, a gate circuit interposed between the transducer means and the coincidence means, a control circuit connected with the gate circuit for opening and closing thereof and connected with the relay actuated valve for opening the valve simultaneously with opening of the gate circuit, said control circuit including a manual switch for conditioning the control circuit for energization and a crankshaft actuated switch for energization of the control circuit, a presettable totalizer counter interposed between the transducer means and the gate circuit and adapted to develop a gate circuit closing signal upon the occurrence of a predetermined number of peak pressure signals, and a manual selector switch connected with the gate circuit to permit opening and closing of the gate circuit at the will of the operator.

11. In combination, an internal combustion engine having a cylinder and a piston defining a combustion chamber and a crankshaft driven by the piston, a pressure signal generator responsive to combustion chamber pressure for developing a peak pressure signal upon the occurrence of maximum pressure in each cycle of engine operation, a reference signal generator responsive to crankshaft rotation for developing plural displacement signals for each cycle of engine operation, coincidence means having a different channel corresponding to each of said plural displacement signals, a gate signal generator connected between the reference signal generator and the coincidence means and responsive to said displacement signals for sequentially gating the coincidence means, and means in each channel for indicating coincidence of the peak pressure signal with a displacement signal in each cycle of engine operation, and means responsive to crankshaft displacement for injecting deposits into said combustion chamber and for simultaneously initiating application of the peak pressure signals to the coincidence means.

References Cited in the file of this patent

UNITED STATES PATENTS 2,787,418   MacKnight et al. _____ Apr. 2, 1957

OTHER REFERENCES

"32 Channel High Speed Commutator," by Albert et al., in Electronics, November 1950.

"High Speed Frequency Counter," in Electronics, December 1951.

Electronic Gating Knockmeter, by Adams, in Instruments, volume 52, Numbers 37, 39, 41, January 4–February 15, 1954.

A Multi Channel Pulse-Height and Delay Time Recorder, by Ortel, in Review of Scientific Instruments, vol. 25, No. 2, February 1954.